Jan. 17, 1967   R. F. ANDERSON ETAL   3,298,288
CARTON INFEED MECHANISM
Filed Jan. 31, 1964   9 Sheets-Sheet 3

Inventors
Ralph F. Anderson
Leo Strombeck
By McCanna, Morsbach & Pillote
Atty's

United States Patent Office 3,298,288
Patented Jan. 17, 1967

3,298,288
CARTON INFEED MECHANISM
Ralph F. Anderson, 332 Calvin Park Blvd., Rockford,
Ill., and Leo Strombeck, Rockford, Ill.; said Strombeck
assignor to said Anderson
Filed Jan. 31, 1964, Ser. No. 341,527
12 Claims. (Cl. 93—53)

This invention relates to an apparatus for feeding and erecting cartons in preparation for subsequent filling of the cartons in a filling machine.

An important object of this invention is to provide a carton feeding and erecting apparatus which will reliably and accurately feed flattened cartons one at a time from a stack to a conveyor and open and square the cartons as they are moved to the conveyor.

Another object of this invention is to provide a carton feeding and erecting apparatus which is capable of feeding and opening flattened cartons having relatively flexible side walls, as well as flattened cartons which are warped somewhat out of a normal planar configuration.

Another object of this invention is to provide a carton feeding and erecting apparatus which is compact and will effect feeding and squaring of a carton in small space.

A more particular object of this invention is to provide a carton feeding and erecting apparatus wherein one side panel of the end carton in a stack is gripped and moved laterally off the stack to a conveyor, and a means is provided for obstructing lateral movement of at least one other panel on the flattened carton to thereby open and substantially square the carton as it is moved laterally off the stack to the conveyor.

A further object of this invention is to provide a carton feeding and erecting apparatus for feeding flattened cartons from a stack to a conveyor and for squaring the carton as it is moved to the conveyor, and a conveyor apparatus for advancing the open carton wherein the conveyor apparatus is arranged to fold the lower trailing flap on the carton and to underlie and support the carton prior to release of the carton by the feeding and erecting apparatus.

Yet another object of this invention is to provide, in a filling machine having a conveyor for advancing opened cartons through the machine, a carton feeding and erecting apparatus for feeding flattened cartons from a stack to the conveyor and for feeding the cartons as they are moved to the conveyor, and which erecting apparatus has a simple drive mechanism operated by the conveyor for actuating the feed mechanism in timed relation with the conveyor.

These, together with other objects and advantages of this invention, will be more readily appreciated as the invention becomes better understood by reference to the following detailed description, when taken in connection with the accompanying drawings wherein.

The carton feeding and erecting apparatus of the present invention is of general utility for use in feeding flattened cartons from a stack to a conveyor and for opening and squaring the carton as it is moved from the stack to the conveyor. In its preferred form, the conveyor forms a part of a filling machine and the conveyor is arranged to advance the opened cartons past a first flap folding apparatus which closes the lower end of the carton and then past the filling station and to a further flap folding apparatus which closes the upper end of the carton.

The carton feeding and erecting apparatus in general includes a magazine 21 for storing a stack of flattened cartons, with the end carton in the stack laterally offset from a conveyor 22. A vacuum operated gripper mechanism 23 is provided for engaging the face of an end carton in the stack and is movable from a position engaging one of the panels of the flattened carton in the stack, to a position adjacent one side of the conveyor to move that panel laterally off the stack and into position at the conveyor. A means is provided for opening the carton in response to movement of the same laterally off the stack into engagement with the conveyor. The application of vacuum to the gripper means 23 is controlled by vacuum control apparatus 25 which is operated in timed relation with the movement of the gripper means. The gripper means is moved in timed relation with the movement of the conveyor means and, preferably, the operating mechanism 26 for moving the gripper means is actuated by the conveyor 22. A combination flap folder and carton support 27 is preferably provided for folding the lower trailing flap on the carton and for supporting the carton when it is released by the gripper means, and a further flap folding mechanism 28 is preferably provided for folding the lead flap on the upper end of the carton forwardly so as to facilitate subsequent filling of the carton.

The carton erecting and folding apparatus is generally adapted for handling flattened cartons of the type having four panels hingedly articulated together along the corner fold lines. In the form of the carton illustrated in FIGS. 8 and 9, and designated generally by the letter X, the carton includes first and second sidewalls $a$ and $b$ and first and second end walls $c$ and $d$. Flaps designated $a'$, $b'$, $c'$ and $d'$ are provided on the upper ends of the side walls $a$–$d$ and lower flaps designated $a''$–$d''$ are provided on the lower ends of the respective side walls. When the carton is in its flattened condition, the first side and end walls $a$ and $c$ are disposed at one side of the carton and the second side wall and end walls $b$ and $d$ are disposed at the other side of the carton. As shown in FIG.

Figures 7, 8, 9:
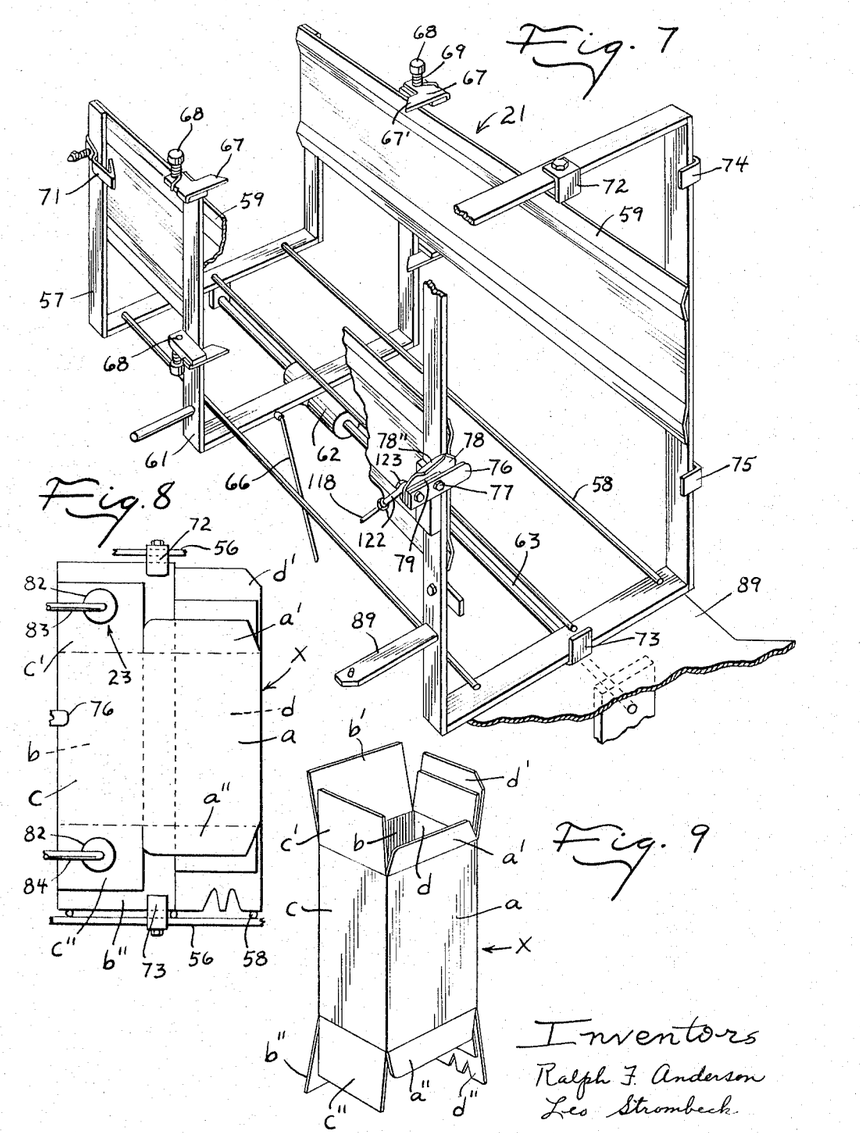
FIG. 7 is a fragmentary perspective view of the magazine for supporting the stack of flattened cartons.
FIG. 8 is a front view of a flattened carton in the carton magazine.
FIG. 9 is a perspective view of an opened carton of the type adapted to be erected by the feeding and erecting mechanism of the present invention.

8, the upper and lower flaps designated $b'$ and $b''$ on the second side wall are somewhat larger than the corresponding flaps $c'$ and $c''$ on the front side wall and project outwardly therefrom. As is conventional, the flaps are connected to the respective walls along fold lines.

Figure 1:
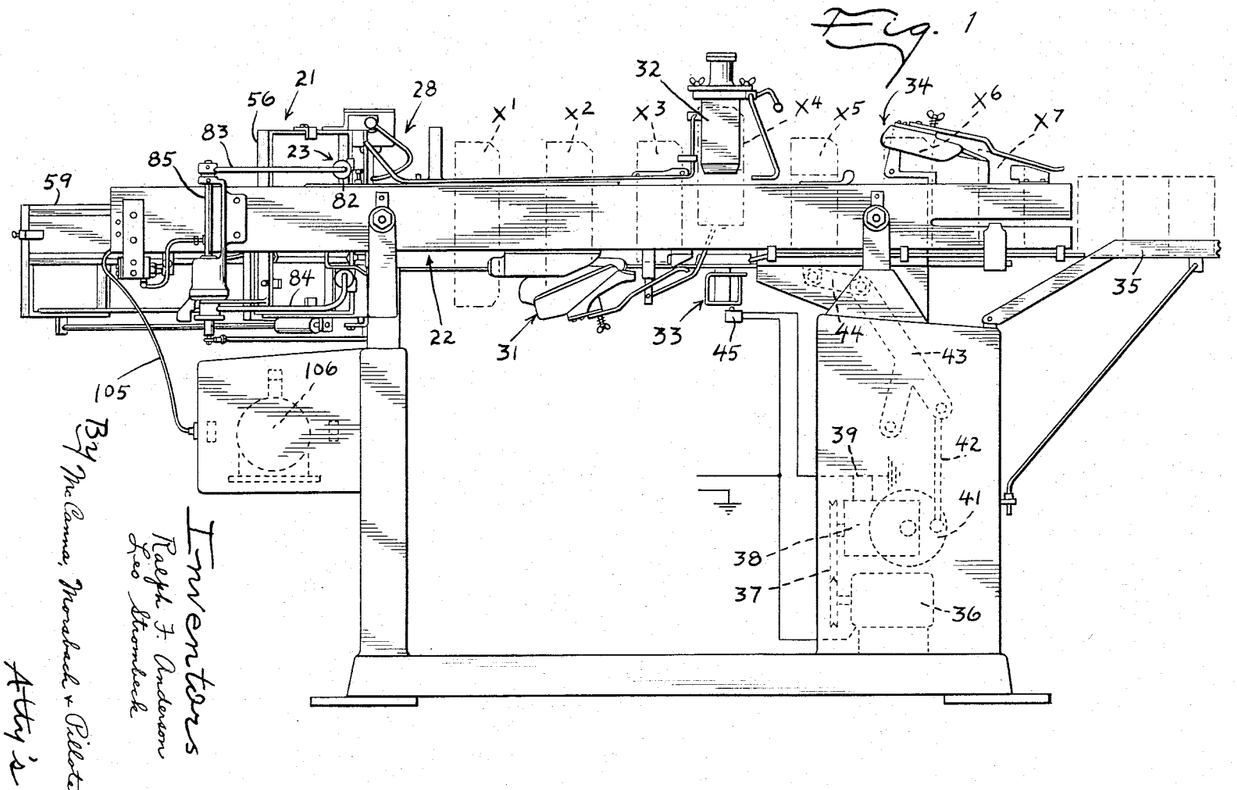
FIGURE 1 is a side elevational view of a filling machine embodying the carton feeding and erecting apparatus of the present invention.

The carton feeding and erecting apparatus is shown in FIG. 1 applied to a filling machine of the general type disclosed in the patent to Anderson, No. 2,612,016 and reference is hereby made to that patent for a more complete description of the construction and operation of the filling and closing mechanism, and the drive mechanism for the filling machine. In general, the filling machine includes a lower flap folding mechanism 31 arranged to complete the closing of the lower flaps on the carton; a filling apparatus including a nozzle 32 and an elevator 33 for elevating a container at the filling station into telescoping relation with the nozzle; and an outlet flap folding mechanism 34 for closing the flaps on the upper end of the carton after it has been filled.

The lower flap folding mechinsm 31 may be of any suitable construction for infolding the lower flaps $a''$, $c''$ and $d''$ in proper sequence as the carton moves therepast and, similarly the upper flap folding mechanism may be of any construction suitable for folding the upper flaps in proper sequence. The particular flap folding structure used will vary dependent upon the type and shape of the carton and flap and may, for example, be of the type disclosed in the aforementioned Anderson patent.

The aforementioned conveyor mechanism 22 is arranged to advance the opened cartons in step fashion through the filling machine and, as diagrammatically shown in FIG. 1, the drive mechanism for the conveyor includes a drive motor 36 which is connected through a belt 37 to a one revolution clutch 38 operated by an electro-responsive operator 39. The clutch drives a crankwheel 41 which is connected through a link 42, crank 43 and link 44, to the transfer mechanism forming a part of the conveyor 22 and described more specifically hereinafter, to reciprocate the transfer mechanism whenever the electro-responsive operator 39 is actuated. The operator 39 is conveniently actuated under the control of a detector, diagrammatically indicated as a switch 45 in FIG. 1, and which switch is operated when the filled container at the filling station moves downwardly to point in which its upper edge is at a level adjacent the lower end of the nozzle. At that time, the switch 45 is closed to operate the clutch 38 and move the transfer mechanism through one cycle.

Figure 2:
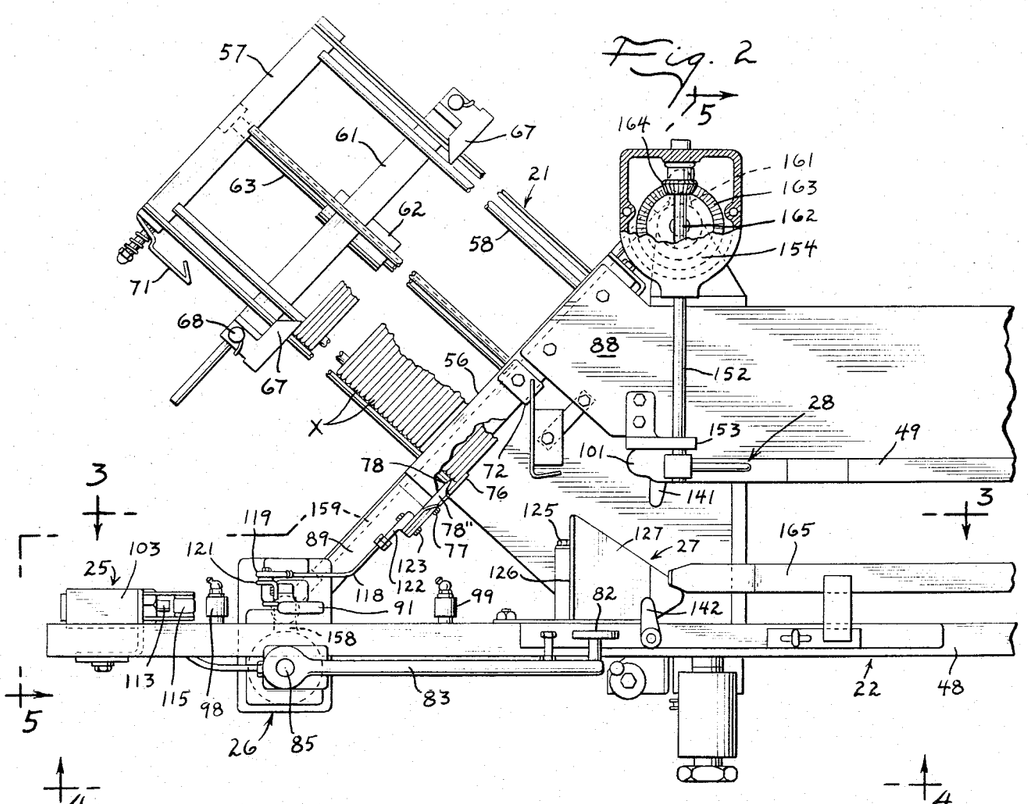
FIG. 2 is a fragmentary top plan view of the filling machine and illustrating the carton feeding and erecting apparatus.
Figure 3:
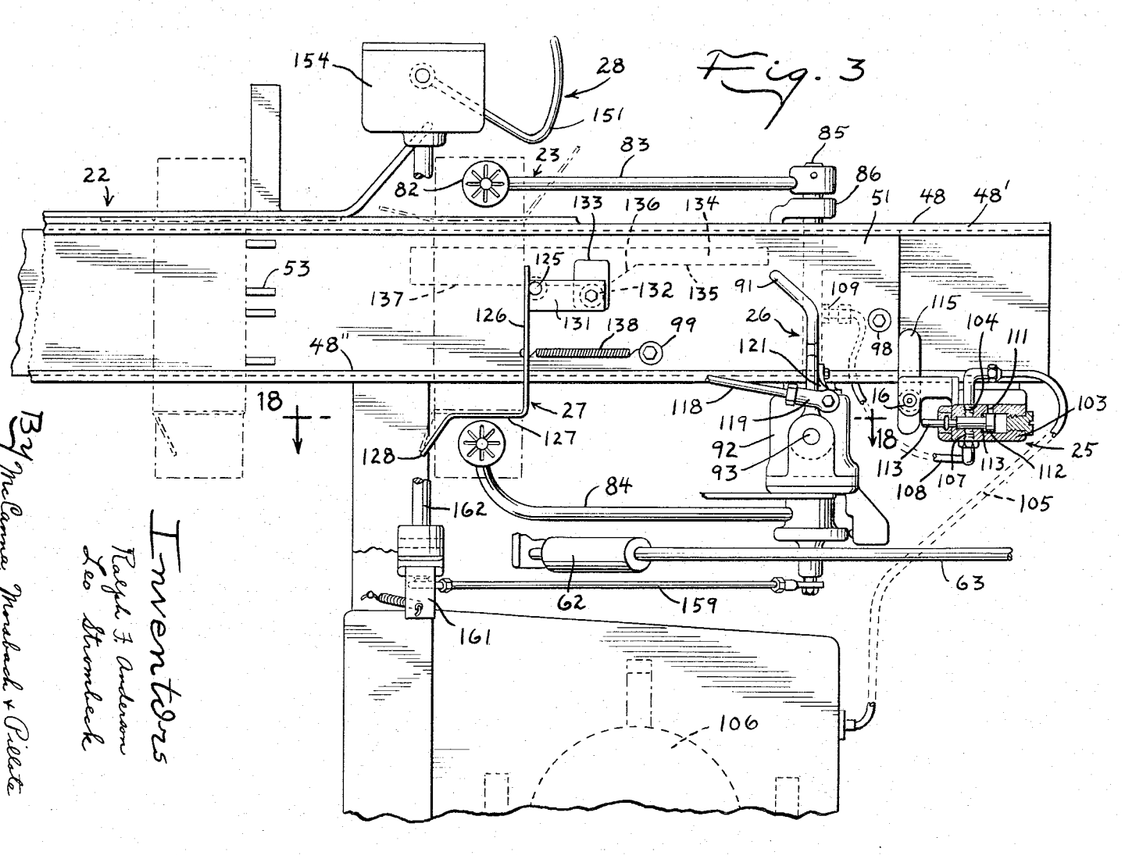
FIG. 3 is a fragmentary longitudinal sectional view taken on the plane 3—3 of FIG. 2.
Figure 5:
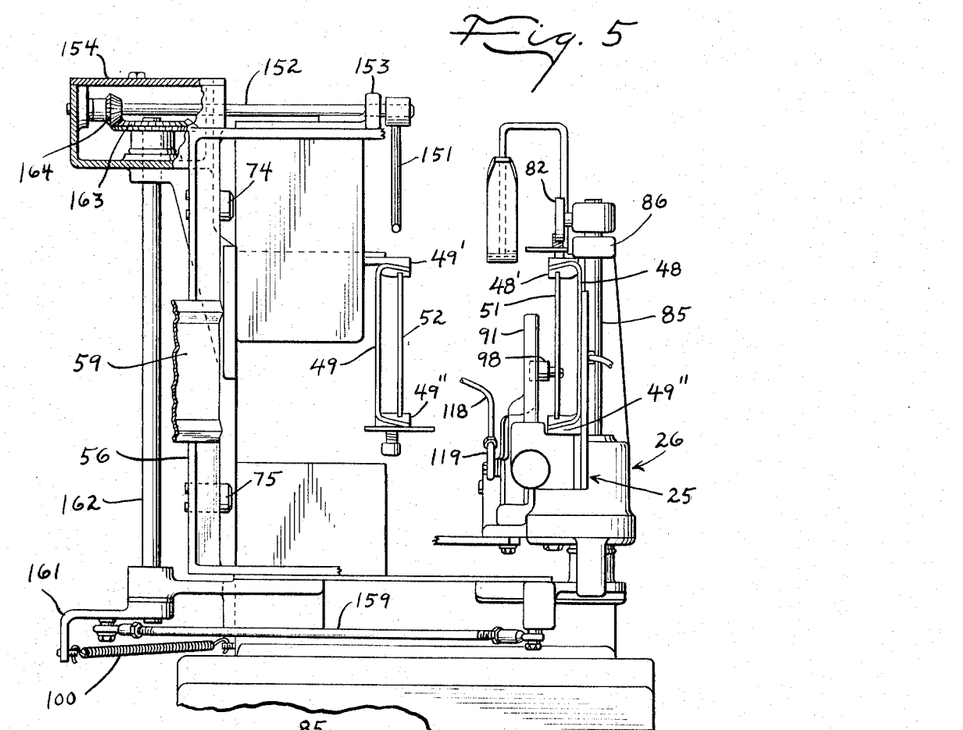
FIG. 5 is a fragmentary end elevational view of the filling machine embodying the carton erecting and folding apparatus, and taken on the plane 5—5 of FIG. 2.
Figure 6:
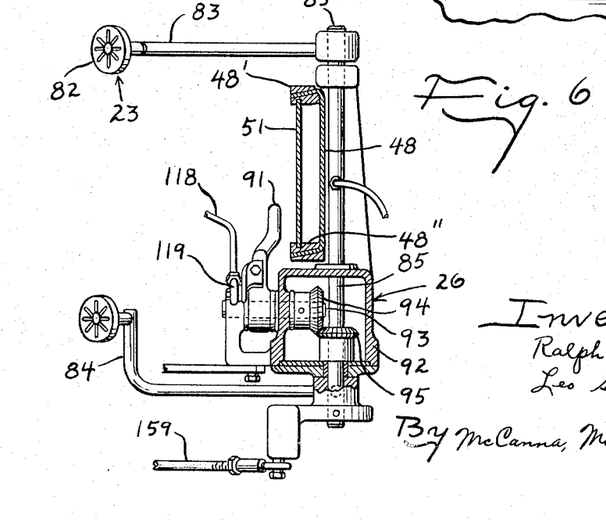
FIG. 6 is a fragmentary vertical sectional view taken on the plane 6—6 of FIG. 4 and illustrating the carton feeding mechanism in a position to engage a carton in the stack.
Figure 10:
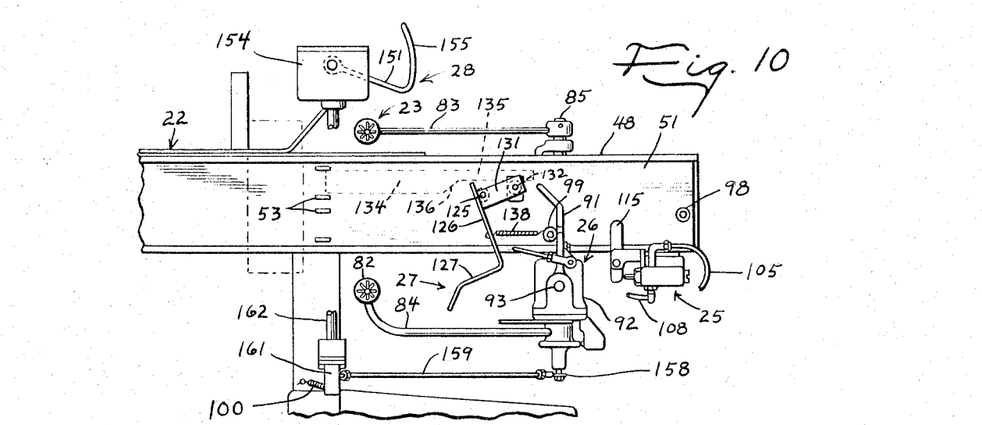
FIGS. 10, 11 and 12 are fragmentary longitudinal sectional views taken on the plane 3—3 of FIG. 2 and illustrating the apparatus in different moved positions.
Figure 12:
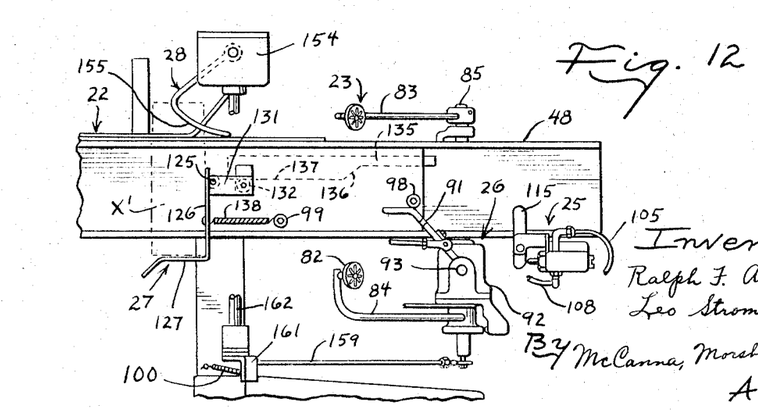
Figure 13:
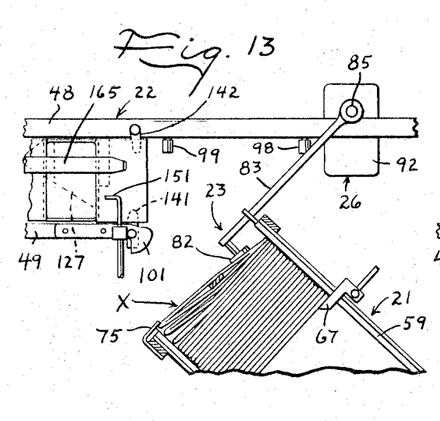
FIGS. 13, 14, 15, 16 and 17 are fragmentary top plan views of the carton erecting and folding apparatus and illustrating different sequential positions of the mechanism during withdrawal of a flattened carton from the stack and opening and squaring of the carton as it is moved to the conveyor mechanism.
Figure 17:
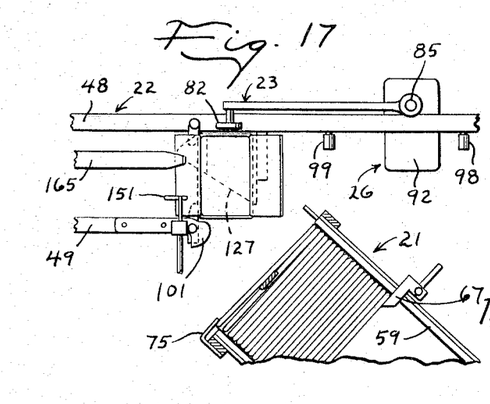

The conveyor 22 preferably includes a pair of laterally spaced guide rails 48 and 49 which are spaced apart to guidably receive a container therebetween. As best shown in FIGS. 5 and 6, the rails 48 and 49 have upper guide edges designated 48' and 49' and lower guide edges 48'' and 49'' which are spaced apart a distance substantially equal to or slightly less than the spacing between the opposite end panels such as $c$ and $d$ on the carton to guidably engage and support the carton, as it is advanced along the rails. The transfer mechanism, herein shown in the form of spaced slide plates 51 and 52 are mounted on the rails 48 and 49 respectively for reciprocation lengthwise of the rails and a plurality of pusher fingers such as indicated at 53 in FIG. 3 are provided at spaced points along each of the slides to advance the containers along the rails. The pusher fingers are arranged to engage a carton between the rails and advance the same with the slides when the slides are moved forwardly or extended, and the fingers are laterally yieldably to pass around or bypass the containers when the slides are moved rearwardly or retracted. Preferably, the slides 51 and 52 are normally positioned in a stop position such as shown in FIGS. 2, 3 and 17 in which the slides are intermediate their fully extended and fully retracted positions, and the drive mechanism is adapted, when operated, to sequentially move the slides forwardly from the position shown in FIGS. 2 and 3 to a fully extended position such as shown in FIGS. 12 and 13, and then back to a fully retracted position as shown in FIG. 10 and finally back to the stop position shown in FIGS. 2, 3 and 17. In the embodiment illustrated, the cartons are advanced through seven steps or stations as they move along the conveyor means, which stations are designated X1–X7, it being understood that the stroke of the machine and hence the number of steps or stations can be varied as desired.

As best shown in FIGS. 2 and 13–17, the rail 48 is somewhat longer than the rail 49 and extends a substantial distance beyond the inlet end of the rail 49. The magazine 21 is positioned to support a stack of flattened cartons with the end carton spaced laterally from the guide rail 48. While the carton magazine can have various different constructions, it is preferably formed in the manner best shown in FIG. 7. In general, the magazine includes a rectangular forward frame member 56 and a generally U-shaped rear frame member 57 with bottom guide rods 58 and side guide plates 59 extending between the forward and rear members. A carton feed carriage is mounted for movement longitudinally of the magazine and, as shown, includes a generally U-shaped frame 61 which is slidably mounted by means of a sleeve 62 on a rod 63 fixed to the magazine. The carriage 61 is yieldably urged in a direction toward the forward end of the magazine to advance the cartons to the front of the magazine and for this purpose is provided with a cable 66 which is connected to a suitable weight or spring (not shown) arranged to yieldably bias the carriage in a forward direction. The U-shaped carriage extends alongside the guide plates 59 and has dogs 67 mounted on the upwardly extending legs thereof, which dogs extend inwardly to engage the rearmost carton in the magazine. It is necessary to periodically replenish the supply of cartons in the magazine while the machine is in operation and, in order to facilitate reloading the magazine without interruption of the advance of the cartons, the carriage is arranged so that the new supply of cartons can be positioned in the magazine at the rear of the carriage, and the carriage then retracted to a position rearwardly of the new stack of cartons, to engage and advance the same. For this purpose, the dogs 67 are pivotally mounted as by pins 68 for swinging movement into and out of the path of the cartons, and the dogs are yieldably urged into carton engaging position as by springs 69. The rear face of the dogs is preferably bevelled as indicated at 67' to cam the dogs outwardly when the carriage is retracted, to pass around the succeeding charge of cartons. When released, the carriage moves forwardly to engage the rearmost carton in the magazine and apply pressure to the cartons to advance the same to the front end of the magazine. A releasable latch 71 may be provided on the magazine for latching the carriage in its retracted position, to facilitate the initial loading of the magazine.

The cartons, when in their flattened condition in the magazine, have one side $a$ and one end wall $c$ disposed at one side of the carton and the other side $b$ and end wall $d$ at the other side of the flattened carton, and provision is made for releasably retaining the flattened cartons in the magazine to allow removal of the cartons, one at a time, by the carton feed mechanism. As shown in FIG. 8, the upper and lower flaps $b'$ and $b''$ on the second side wall $b$ are somewhat larger than the flaps $c'$ and $c''$ on the first end wall, and upper and lower stop fingers 72 and 73 are provided on the magazine frame 56 and positioned to engage the upper and lower flaps $b'$ and $b''$. The stop fingers aid in retaining the flattened cartons in the magazine and, in addition, function in a manner described hereinafter to aid in opening the carton as the cartons are removed from the magazine. Side stop fingers such as 74 and 75 are also provided on the carton at one side thereof to engage the flattened carton adjacent one side edge and a movable stop finger 76 is mounted on the frame 56 adjacent the other side edge. In the embodiment shown in FIGS. 1–17, the movable stop finger 76 is pivotally mounted on a pin 77 for movement in a plane generally paralleling the front face of the end carton in the stack into and out of the stop position shown in FIG. 7. A stripper finger 78 is preferably mounted on the movable stop finger 76 for movement therewith, and which stripper finger is spaced inwardly from the stop finger and by a spacer 79 a distance corresponding to the thickness of a flattened carton. The nose of the stripper finger 78 is angularly spaced somewhat from the nose of the stop finger 76 so as to engage between the end carton and the next succeeding carton as the stop finger is moved out of engagement with the front side of the end carton. A cam surface 78'' is preferably provided on the stripper finger 78, to aid in separating the end carton from the stack. A mechanism, described hereinafter, is provided for moving the stop finger and stripper finger in timed relation with the feed mechanism.

In the preferred embodiment of the feed mechanism illustrated, the vacuum operated gripper means includes a pair of suction cups 82 which are mounted on upper and lower arms 83 and 84 for swinging movement about the axis of a shaft 85. The shaft is conveniently mounted for rotation about an upright axis by a bracket 86 attached to the rail 48 at a point spaced a substantial distance from the end of the rail 49, and the arms 83 and 84 are movable from a position as shown in FIG. 2 in which the vacuum cups 82 are disposed adjacent the plane of the inner side of the rail 48, to a position as shown in FIG. 13 wherein the vacuum cups engage the face of the end carton in the magazine. Preferably, the magazine is positioned at a angle to the rail 48 such that the front face of the end carton in the magazine extends substantially parallel to the face of the vacuum cup 82, when the latter is in engagement therewith. As best shown in FIGS. 2 and 7, the magazine is supported on the filling machine in this position by upper and lower brackets designated 88 and 89.

Figure 4:
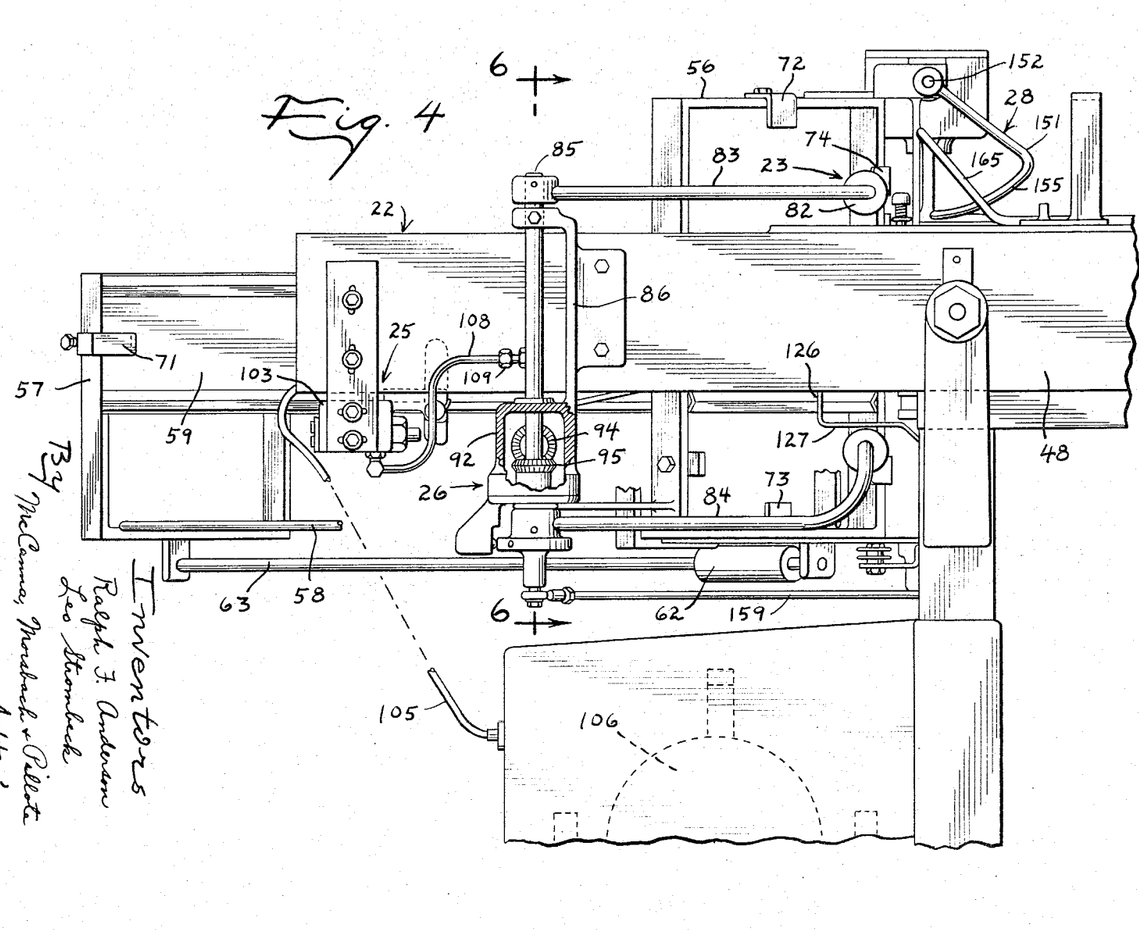
FIG. 4 is a fragmentary side elevational view, taken on the plane 4—4 of FIG. 2.

The vacuum cups 82 are moved from their normal position shown in FIG. 2 into their carton engaging position shown in FIG. 13 in which they engage the end carton in the stack and back to their normal position, in timed relation with the movement of the transfer mechanism on the conveyor 22, to feed cartons from the stack to the conveyor and to open the cartons as they are moved toward the conveyor. The feed mechanism is preferably operated from the transfer mechanism and, for this purpose, there is provided an actuating lever 91 which is pivotally mounted on a gear case 92 for movement about the axis of a shaft 93. Bevel gears 94 and 95 (see FIGS. 4 and 6) are provided in the gear case and connect the shaft 93 to the shaft 85 to rotate the latter in response to swinging movement of the actuator arm 91.

A first actuating roller 98 is provided on the slide 51 to engage the arm 91 during extension of the slide, to thereby move the arms 83 and 84 into their carton engaging position shown in FIG. 13 and a second actuating roller 99 is provided on the slide to move the arm back to the normal position during retraction of the slide to thereby remove a carton from the stack.

Figure 14:
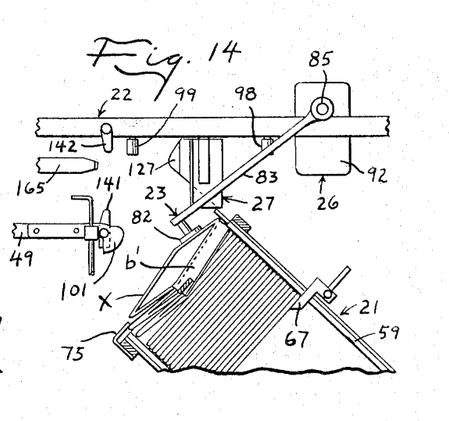

As shown in FIG. 8, the upper and lower vacuum cups 82 on the arms 83 and 84 are preferably arranged to engage the upper and lower end flaps c' and c'' on the end wall c located at the front side of the flattened carton. As the vacuum cups are moved back to their normal position, they draw the upper and lower end flaps c' and c'' and the respective front end panel with the vacuum cups. The upper and lower stops 72 and 73 retard movement of the flaps b' and b'' on the side wall at the rear side of the flattened carton so that the withdrawal of the flattened carton by the gripper means tends to partially open the flattened carton during movement of the same of the magazine. Opening of the end carton as it is moved off the magazine would be substantially impeded if the end carton was distorted substantially out of its normal planar configuration. The side stops 74 and 75 and the movable stop 76 together with the upper and lower stops 72 and 73 provide a peripheral support for the front face of the end carton and which peripheral support will not only aid in maintaining the end carton in a generally flat condition, but will also aid in flattening previously warped cartons. As the vacuum operated gripper means moves the end carton off the magazine, the stop 76 moves out of engagement with the face of the end carton and the stripper finger 78 moves between the end carton and the next succeeding carton to aid in separating the same. The stripper finger also functions to stop the succeeding cartons to prevent withdrawal of more than one carton at a time. Since the carton is partially opened as it moves off the stack, it is diagonally foreshortened and is withdrawn from beneath the side stops 74 and 75. The upper and lower stops 72 and 73 retard movement of the sidewall b at the rear side of the carton to aid in opening the same and the upper and lower end flaps b' and b'' deflect laterally after the carton is partially opened, as shown in FIG. 14, to enable withdrawal of the upper and lower flaps from the upper and lower stops 72 and 73.

Figure 15:
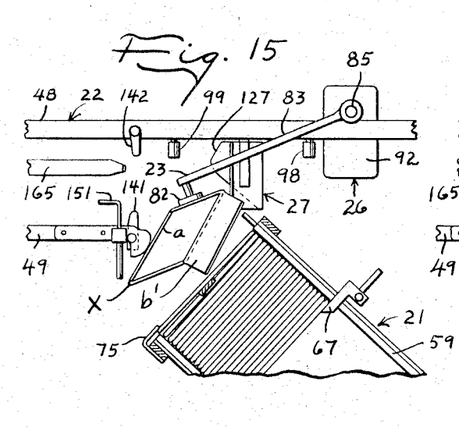
Figure 16:
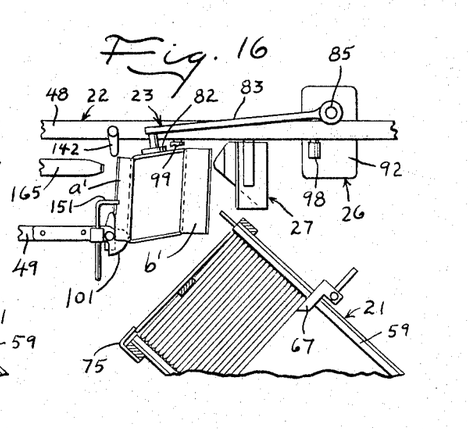

Thus, as the carton leaves the magazine it is partially opened as best shown in FIG. 15. A cam means designated 101 is provided for further deflecting the forward side wall a relative to the forward end wall to complete squaring of the carton, as the forward end wall is moved to a position adjacent the rail 48'. As best shown in FIGS. 2 and 13–17, the cam 101 is preferably located at the end of the rail 49, within the angle subtended by the arms 83 and 84 during movement from the position shown in FIGS. 13 to the position shown in FIG. 17. The cam is, moreover, positioned radially outwardly of the path of travel of the vacuum cups 82, and in a position to engage the forward side wall a of the carton as it is moved off the stack and into engagement with the rail. This deflects the forward side wall to a position substantially perpendicular to the forward end wall of the carton, as the carton moves past the cam 101, (see FIGS. 15–17), and effects squaring of the carton.

The apparatus 25 for controlling the application of vacuum to the vacuum operated gripper mechanism, is also preferably operated from the slide 51, in timed relation with the movement of the feed mechanism. As best shown in FIG. 3, the apparatus 25 includes a valve casing 103 mounted on the rail 48 and having an inlet port 104 connected through a tube 105 to a vacuum pump 106. The casing also has a control port 107 connected through a tube 108 to a fitting 109 on the shaft 85. The shaft 85 and the arms 83 and 84 are preferably made tubular with interconnecting passages that communicate the vacuum cups 82 with the tube 108. The valve 103 also includes an atmospheric vent 111 and a valve member 112 which cooperates with a seat 113 located between the inlet 104 and the vent 111. The valve member is normally positioned as shown in FIG. 3 due to the difference in pressure acting on opposite faces thereof, to close the seat 113 so that vacuum is normally applied to the cups 82. A valve operating lever 115 is pivotally mounted on a bracket 116, for operating the valve in response to movement of the slide. As shown in FIGS. 2 and 10–12, the arm 115 extends upwardly into the path of movement of the roller 98 on the slide, to be engaged by the roller during extension of the same. This effects a momentary operation of the valve and permits the vacuum cups 82 to release the carton at the proper time. During retraction of the slide, the lever 115 merely pivots away from the valve stem and does not operate the same.

The carton stop finger 76 is moved out of engagement with the end carton in the stack, in timed relation with the movement of the vacuum operated gripper means. This is conveniently achieved by operatively conecting the stop finger to the actuator arm 91 for the vacuum operated gripper. As best shown in FIGS. 2, 13, and 7, a link designated 118 has one end 119 pivotally connected to a bracket 121 attached to the arm 91 at a point eccentric to the shaft 93. The link is angulated intermediate its ends and has its other end 122 pivotally attached as by a pin 123 to the movable stop finger 76, at a point eccentric to the pivot axis 77 of the stop finger. With this arrangement, the stop finger is oscillated about its pivot axis in response to movement of the actuator arm 91.

As will be seen from FIG. 17, the carton, at the time it is released by the gripper means, is disposed alongside the rail 48, and is spaced outwardly from the end of the rail 49. A combination flap folder and carton support mechanism 27 is provided on the transfer apparatus for folding the lower trailing flap on the carton and for underlying and supporting the carton as it is advanced to a position between the rails 48 and 49. As best shown in FIGS. 3 and 10–12, the flap folder and carton support includes a generally L-shaped member which is pivotally mounted by a pin 125 on the slide 51, and which L-shaped member has a depending portion 126 arranged to engage the trailing side wall of the carton, and a forwardly extending flap folder portion 127. The flap folder has a downwardly and forwardly extending lip 128 which is arranged to aid in camming the trailing flap into its closed position. The flap folder and support member 27 is movable with the slide 51, and is also swingable relative to the slide between a retracted position as shown in FIG. 10 and a carton support position as shown in FIGS. 2, 3 and 12. A rearwardly extending arm 131 is attached to the support member and has a roller 132 thereon which extends through an opening 133 in the slide and engages a cam track 134 fixed to the inner side of one rail 48. The cam track has a dwell portion 135 which engages the roller when the slide is retracted and a ramp portion 136 intermidiate its ends which forces the roller downwardly and moves the support member to its support position. A second dwell portion 137 extends from the ramp 136 and maintains the support member in its carton supporting position as the slide continues its forward movement. A spring 138 is attached to the support member and to the slide to yieldably urge the support member to its retracted position. As will be seen from FIGS. 10–12, during forward movement of the slide, the support member 27 is swung upwardly from its retracted position shown in FIG. 10 to its support position shown in FIG. 12 to fold the lower trailing flap $b''$ upwardly and inwardly. The depending portion 126 on the support member engages the trailing side wall $b$ of the carton to advance the same and the flap folding portion 127 underlies and supports the carton as it is advanced by the slide, until the carton reaches an extended position as shown in FIGS. 12 and 13, in which the carton is disposed between the rails 48 and 49 and is supported thereby. In order to assure that the carton is properly squared as it enters the space between the guide rails 48 and 49, there are provided a pair of yieldable fingers designated 141 and 142 which engage the lead wall $a$ of the carton as it enters the space between the guide rails 48 and 49, as shown in FIG. 17. If one or the other of the end walls of the carton should lead the other at the time the carton engages the fingers, the fingers 141 and 142 will retard movement of that end wall of the carton until the carton is completely squared. At that time, the fingers 141 and 142 yield laterally to allow the carton to pass into the space between the rails 48 and 49. The latter are spaced apart a distance slightly less than the width of the carton to laterally compress and support the carton therebetween.

Figure 18:
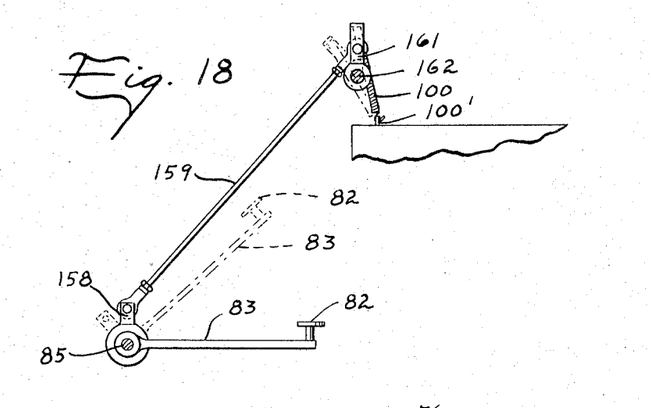
FIG. 18 is a fragmentary horizontal sectional view taken on the plane 18—18.

In order to facilitate filling of the carton, it is advantageous to spread the upper flaps on the carton. The apparatus 28 is provided for folding the upper lead flap on the carton forwardly, as the carton enters the space between the guide rails. This apparatus includes an arm 151 mounted for swinging movement about the axis of a shaft 152 supported in a bracket 153 and in a gear case 154. The arm is swingable through a path to engage the lead flap on the carton, after it has been opened, and the arm has an arcuate extension 155 which is arranged to retain the lead flap in a depressed condition. The lead flap folding mechanism 28 is operated in timed relation with the movement of the carton feed mechanism and is conveniently operated off the shaft 85 for the feed mechanism. As best shown in FIG. 18, the shaft 85 has a lateral arm 158 non-rotatably attached to its lower end and a link 159 is connected to the arm 158 at a point eccentric to the shaft 85. The link is otherwise connected to an arm 161 attached to the lower end of an upright shaft 162. The shaft 162 is connected through bevel gearing 163 and 164 in the gear case 154 to the shaft 152 to rotate the same in response to oscillation of the shaft 85. The lead flap folding arm 151 must move through a somewhat greater arc than the feed arms 83 and 84 and the gear ratio between the bevel gears 163 and 164 is arranged to produce the proper angular movement of the shaft 152 in response to the angular movement of the shaft 85. As shown in FIGS. 2 and 10–12, an upper flap depresser guide 165 is provided along the guide rails 48 and 49 to maintain the upper lead flap $a'$ in a depressed condition and to also depress the trailing flap $b'$ on the upper end of the carton, until the carton reaches the aforementioned filling station. As best shown in FIG. 18, a spring 100 has one end attached to the arm 161 adjacent the connection of the link 159 thereto and the other end 100' attached to a stationary support at a point to provide an over-center spring arrangement for yieldably holding the gripper support arms 83 in either their carton engaging position shown in FIG. 13 and in dotted lines in FIG. 18 or in their release position shown in FIGS. 2 and 17 and in solid lines in FIG. 18. As will be seen from FIG. 18 the point of attachment designated 100' of the spring to the stationary support is such that the axis of the shaft 162 is located within the angle subtended by the spring during angular movement of the arm 161 with the shaft 162.

Figure 19:
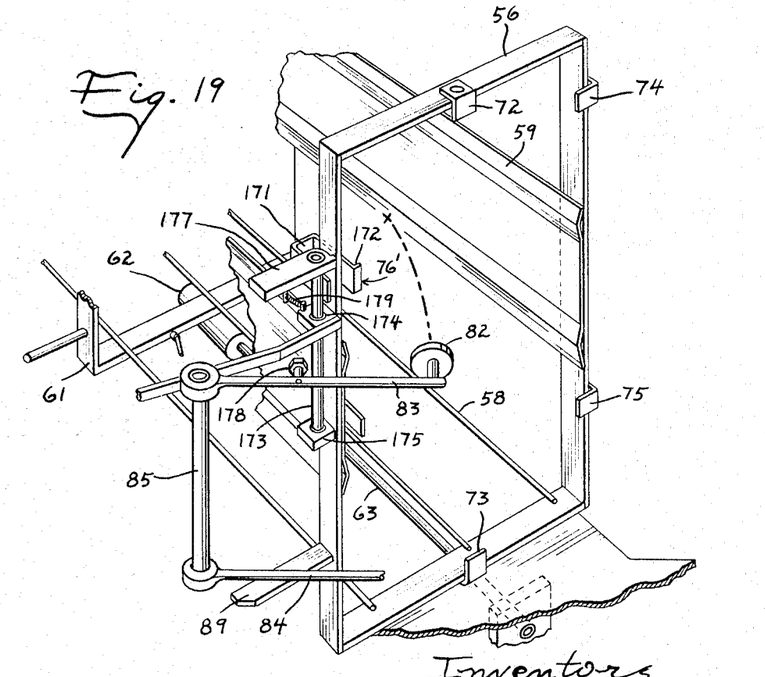
FIG. 19 is a fragmentary perspective view illustrating a modified form of stop mechanism on the carton magazine.

A modified form of carton stop designated 76' is illustrated in FIG. 19. In this embodiment, the carton stop is in the form of a generally U-shaped bracket 171 having an inwardly extending carton engaging finger 172 at one end arranged to engage the outer face of the end carton in the stack. The U-shaped bracket 171 is non-rotatably secured to a shaft 173 which is rotatably supported by brackets 174 and 175 on the magazine frame 56. An actuator arm 177 is non-rotatably attached to one shaft 173 at a level adjacent the path of movement of one of the gripper arms 83 and an adjustable finger 178 is attached to the arm 83 and arranged to engage the arm 177 when the vacuum operated grippers 82 approach a position engaging the end carton in the magazine. The adjustable finger 178 moves the stop 172 out of engagement with the face of the end carton, and holds the stop in its release position until the grippers move the end carton a short distance off the stack. A spring 179 is connected to the arm 177 and to a stationary support to yieldably urge one stop finger 172 into its carton engaging position, when the finger 178 moves out of engagement with the arm.

Figure 11:
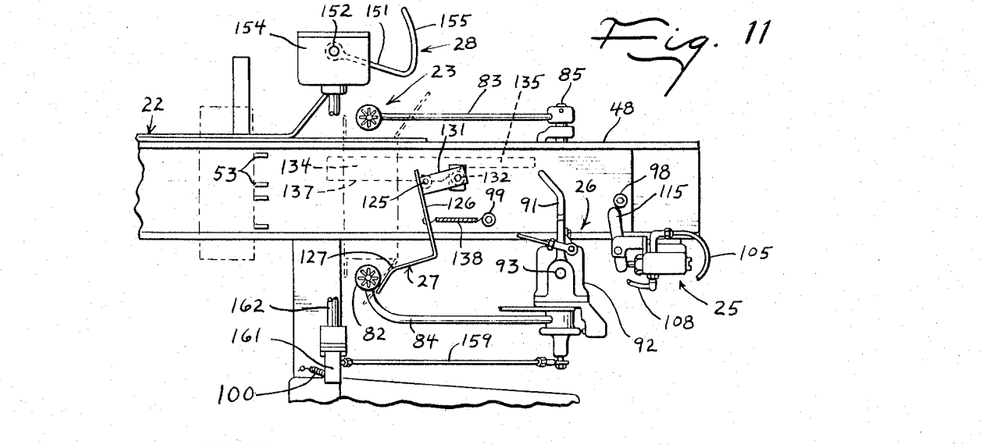

From the foregoing it is thought that the construction and operation of the carton feed mechanism and filling machine will be readily understood. The transfer mechanism or slides 51 and 52 on the conveyor 22 are cyclically operated, either automatically in response to filling of a carton as previously described, or otherwise, to intermittently advance the opened cartons past the lower flap folding shoes to the filling station and to advance the filled cartons past the upper flap folding shoes to a loading platform. The slides are normally in an intermediate position, as shown in FIGS. 2, 3 and 17. In this position, an opened carton is positioned adjacent the end of the rail 49 and is supported by the lower flap folding mechanism 27. As the slides move forward to their full forward position shown in FIGS. 12 and 13, the opened carton, with its lower trailing flap folded upwardly and with its upper lead flap folded downwardly, is advanced to a position between the guide rails 48 and 49 to be supported thereby, as shown at $x1$ in FIG. 1. The slide then retracts from the position shown in FIG. 12 and, as it moves past an intermediate position as shown in FIG. 11, the roller 132 rides upwardly on the ramp 136 and allows the carton support to move to its retracted position. As the slide continues retraction, the roller 99 on the slide engages the actuator arm 91 to move the same back to its upright position as shown in FIG. 10. When the actuator arm moves to its upright position, the vacuum operated gripper cups 82 are moved from a position engaging the carton in the magazine to a position alongside the rail 48 to draw the front side panel of the carton laterally away from the magazine. The upper and lower stop fingers 72 and 73 retard movement of the flaps $b'$ and $b''$ of rear side wall off the magazine to partially open the carton as shown in FIGS. 14 and 15 and, as the carton moves past the cam 101, the latter deflects the front side wall $a$ at an angle to the front end wall $c$ to complete squaring of the carton. In the embodiment of FIGS. 1–18, movement of the actuator arm 91 to its upright position also operates the movable stop finger 76 to move the latter out of engagement with the outer face of the end carton and to move the stripper finger 78 into position between the end carton and the next succeeding carton to separate the latter and to interrupt forward movement of the remainder of the stack. In the embodiment of FIG. 19, the stop finger 76' is released by the finger 178 on the arms 83. In addition, movement of the arm 91 to its upright position also operates the upper flap folding arm 151 to swing the arm in a clockwise direction as viewed in FIGS. 10–12, to fold the upper lead flap forwardly so that the upper lead flap underlies the guide 165. When the carton is advanced after the slide reaches its fully retracted position it then moves forwardly to its stop position. During forward movement of the slide to the stop position shown in FIG. 3, the roller 132 moves downwardly along the ramp 136 and swings the lower flap folder upwardly into a position to fold the lower trailing flap and support the carton. Just before the slide reaches its stop position, the roller 98 on the slide engages the valve operating lever 115 and operates the valve 25 to open the vacuum port 111 and release the carton from the vacuum operated grippers. At that time, the carton remains supported by the flap folder and support 27 and the apparatus is ready for a subsequent cycle.

We claim:

1. An apparatus for erecting flattened cartons of the type having a first end panel and a first side panel at one side of the flattened carton and a second side panel and a second end panel at the other side of the flattened carton, said panels including wall portions and end flaps at the ends of at least some of the wall portions, said apparatus comprising conveyor means including a lateral carton guide means and means for advancing cartons in one direction along said guide means, a magazine for suporting a stack of flattened cartons with the carton at the end of the stack disposed at an angle to said lateral carton guide means and with said one side of the carton of the end carton spaced laterally from said carton guide means, at least one arm mounted for swinging movement about an axis located adjacent the apex of said angle between the end carton and the guide means, vacuum operated gripper means on said arm spaced from said axis and moveable with the arm from a first position engaging the first end panel on the end carton and a second position adjacent said lateral carton guide means, means for moving said arm between said first and second positions, means for controlling the application of vacuum to said gripper means in timed relation with the movement of said arm to pull the end carton laterally away from the stack and into engagement with said lateral carton guide means, and means responsive to movement of the end carton from the stack to said guide means for opening the carton.

2. The combination of claim 1 wherein said carton opening means includes a cam means disposed within the angle subtended by rotation of said arm and spaced radially from the arc of travel of the vacuum gripper means and in the path of movement of said first side panel to deflect said first side panel at an angle to said first end panel and thereby open the carton.

3. In an apparatus for erecting flattened cartons of the type having a first end panel and a first side panel at one side of the flattened carton and a second side panel and a second end panel at the other side of the flattened carton, said panels including wall portions and end flaps at the ends of at least some of the wall portions, conveyor means including a lateral carton guide means and a transfer mechanism mounted for reciprocation lengthwise of said guide means to advance containers therealong in step fashion, a magazine for supporting a stack of flattened cartons with the carton at the end of the stack having said one side of the carton spaced from said lateral carton guide means, vacuum operated gripper means for gripping the face of a panel on the end carton, means operatively connected to said transfer mechanism and responsive to reciprocation of said transfer mechanism for oscillating said gripper means between a first position engaging said first end panel on the end carton in the stack and a second position adjacent said guide means for pulling the first end panel laterally away from the stack and into engagement with said lateral carton guide means, means responsive to movement of the end carton from the stack into engagement with the guide means for opening the carton, and means on the transfer mechanism engageable with the opened carton for advancing the same along the guide means.

4. In an apparatus for erecting flattened cartons of the type having a first end panel and a first side panel at one side of the flattened carton and a second side panel and a second end panel at the other side of the flattened carton, said panels including wall portions and end flaps at the ends of at least some of the wall portions, conveyor means including a lateral carton guide means and a transfer mechanism mounted for reciprocation lengthwise of said guide means to advance containers therealong in step fashion, a magazine for supporting a stack of flattened cartons with the carton at the end of the stack having said one side of the carton spaced from said lateral carton guide means, vacuum operated gripper means for gripping the face of a panel on the end carton, means operated in timed relation with the movement of said transfer mechanism for moving said gripper means from a first position engaging said first end panel on the end carton in the stack to a second position adjacent said guide means for pulling the first end panel laterally away from the stack and into engagement with said lateral carton guide means, means responsive to movement of the end carton from the stack into engagement with the guide means for opening the carton, a carton engaging member mounted on the transfer means and engageable with the opened carton for advancing the carton along the guide means, said carton engaging member having lower flap folding means thereon engageable with the lower trailing flap on the second side panel to fold the same upwardly and inwardly to at least partially close the lower end of the carton and to support the same when the vacuum operated gripper means is released.

5. In an apparatus for erecting flattened cartons of the type having a first end panel and a first side panel at one side of the flattened carton and a second side panel and a second end panel at the other side of the flattened carton, said panels including wall portions and end flaps at the ends of at least some of the wall portions, conveyor means including a lateral carton guide means and a transfer mechanism mounted for reciprocation lengthwise of said guide means to advance containers therealong in step fashion, a magazine for supporting a stack of flattened cartons with the carton at the end of the stack having said one side of the carton spaced from said lateral carton guide means, vacuum operated gripper means for gripping the face of a panel on the end carton, means operated in timed relation with the movement of said transfer mechanism for moving said gripper means from a first position engaging said first end panel on the end carton in the stack to a second position adjacent said guide means for pulling the first end panel laterally away from the stack and into engagement with said lateral carton guide means, means responsive to movement of the end carton from the stack into engagement with the guide means for opening the carton, and means on the transfer means engageable with the opened carton for advancing the same along the guide means, and means on said transfer means engageable with the lower trailing flap on the second side panel for folding the lower trailing flap upwardly and for underlying and supporting the opened carton when the vacuum operated gripper means is released.

6. In an apparatus for erecting flattened cartons of the type having a first end panel and a first side panel at one side of the flattened carton and a second side panel and a second end panel at the other side of the flattened carton, said panels including wall portions and end flaps at the ends of at least some of the wall portions, conveyor means including a lateral carton guide means and a transfer mechanism mounted for reciprocation lengthwise of said guide means to advance containers therealong in step fashion, a magazine for supporting a stack of flattened cartons with the carton at the end of the stack having said one side of the carton spaced from said lateral carton guide means, vacuum operated gripper means for gripping the face of a panel on the end carton, means operated in timed relation with the movement of said transfer mechanism for moving said gripper means from a first position engaging said first end panel on the end carton in the stack to a second position adjacent said guide means for pulling the first end panel laterally away from the stack and into engagement with said lateral carton guide means, means responsive to movement of the end carton from the stack into engagement with the guide means for opening the carton, said transfer mechanism including a reciprocable slide and a generally L-shaped member mounted on the slide for movement therewith, said L-shaped member including a first downwardly extending leg for engaging an opened carton to advance the same and a second flap folding leg extending forwardly from said first leg for folding the lower flap on the trailing side panel upwardly and inwardly to at least partially close the bottom of the carton and to support the same when the vacuum operated gripper means is released.

7. The combination of claim 6 wherein said L-shaped member is supported on the slide for limited horizontal swinging movement relative thereto, and cam means operative when the slide reciprocates for controlling swinging movement of said L-shaped member to move the same into and out of a flap folding position.

8. In an apparatus for erecting flattened cartons of the type having a first end panel and a first side panel at one side of the flattened carton and a second side panel and a second end panel at the other side of the flattened carton, said panels each having wall portions and upper and lower end flaps at opposite ends of the wall portions, conveyor means including laterally spaced carton guides and a transfer mechanism mounted for reciprocation lengthwise of said guides, a magazine for supporting a stack of flattened cartons with the carton at the end of the stack having said one side of the carton spaced from one of said lateral carton guides, vacuum operated gripper means for gripping the face of a panel on the end carton, means operatively connected to the transfer means for moving said gripper means from a first position engaging said first end panel on the end carton to a second position adjacent said one carton guide for pulling the first end carton laterally away from the stack and for moving said first end panel into engagement with said one of said carton guides, means operative in response to movement of the end carton away from the stack and into engagement with said lateral carton guide means for opening the carton, means on said transfer means engageable with the opened carton for advancing the same along said lateral carton guides, means mounted on said transfer means for movement therewith and engageable with the lower flap on the side panel that trails for folding the same upwardly and inwardly to at least patrially close the bottom of the carton, means operatively connected to said transfer means and engageble with the upper flap on the side panel that leads for folding the same downwardly and forwardly, and means for controlling the application of vacuum to said gripper means in timed relation to the movement thereof.

9. A device for removing and erecting cartons from a stack of flattened magazines in a magazine comprising in combination
 (a) at least one pivotally mounted arm member extending outwardly from its axis of rotation,
 (b) mounting means for said arm member,
 (c) at least one vacuum cup affixed to the outermost extremity of said arm member,
 (d) a vacuum source communicated with said vacuum cup,
 (e) valve means for porting said vacuum cup to environmental pressure,
 (f) means for rotating and counter-rotating said arm member through an angle of travel of less than 360°,
 (g) means for biasing said valve means,
 (h) cam means disposed within the angle subtended by rotation of said arm member and offset in radial direction from the arc of travel of said vacuum cup,
 (i) at least one projecting member disposed substantially in the radial plane of said vacuum cup at an extremity of travel of said arm member wherein said projecting member interferes with passage of a carton flattened into a planar configuration carried by said vacuum cup thereby to cause the carton to be distorted from planar configuration to a configuration of parallelogram cross-section in passing thereby, said carton being further distorted in passing said cam member into a substantially rectangular configuration in transverse cross section.

10. The device of claim 9 wherein said means for rotating and counter-rotating said arm member comprises an actuating lever, means operably connecting said arm member and said actuating lever, and a reciprocally movable operator for biasing said lever.

11. In an apparatus for erecting flattened cartons of the type having a first end panel and a first side panel at one side of the flattened carton and a second side panel and a second end panel at the other side of the flattened cartons, said panels each including wall portions and end flaps at the upper and lower ends of at least some of the wall portions, first and second lateral carton guide means and conveyor means movable lengthwise of the guide means to advance cartons therealong, said first carton guide means having a portion extending beyond one end of said second carton guide means, a magazine for supporting a stack of flattened cartons adjacent said one end of the second carton guide means with the end carton in the stack having said one side spaced from said portion of said first carton guide means, vacuum operated gripper means mounted for movement between a first position gripping the face of said first end panel on the end carton in the stack and a second position adjacent said portion of the first guide means for pulling said first end panel on the end carton in the stack laterally away from the stack and into engagement with said portion of said first guide means, lower flap folding means mounted on said conveyor means for movement therewith and engageable with the lower flap on said second side panel for infolding the same upwardly and inwardly to at least partially close and support the opened carton, and means on said conveyor means for engaging the second wall portion on the opened carton after the lower flap thereon has been infolded substantially to advance the opened carton along said guide means.

12. An apparatus according to claim 11 including means for infolding the other lower flap on the carton as it is moved along said lateral carton guide means, said conveyor means being operative to retract said lower flap folding means away from said carton before the other lower flaps on the carton are infolded.

References Cited by the Examiner
UNITED STATES PATENTS

| | | | |
|---|---|---|---|
| 2,369,914 | 2/1945 | LaBombard | 271—32 X |
| 2,643,497 | 6/1953 | Woelfer | 93—53 X |
| 2,914,323 | 11/1959 | Sramek | 271—32 |
| 2,973,608 | 3/1961 | Killion | 93—53 X |
| 3,142,232 | 7/1964 | Pierce et al. | 93—53 |

BERNARD STICKNEY, *Primary Examiner.*